July 12, 1949.  E. F. LOWEKE  2,476,054
PRESSURE REGULATING VALVE ASSEMBLY
Original Filed July 19, 1944  2 Sheets-Sheet 1
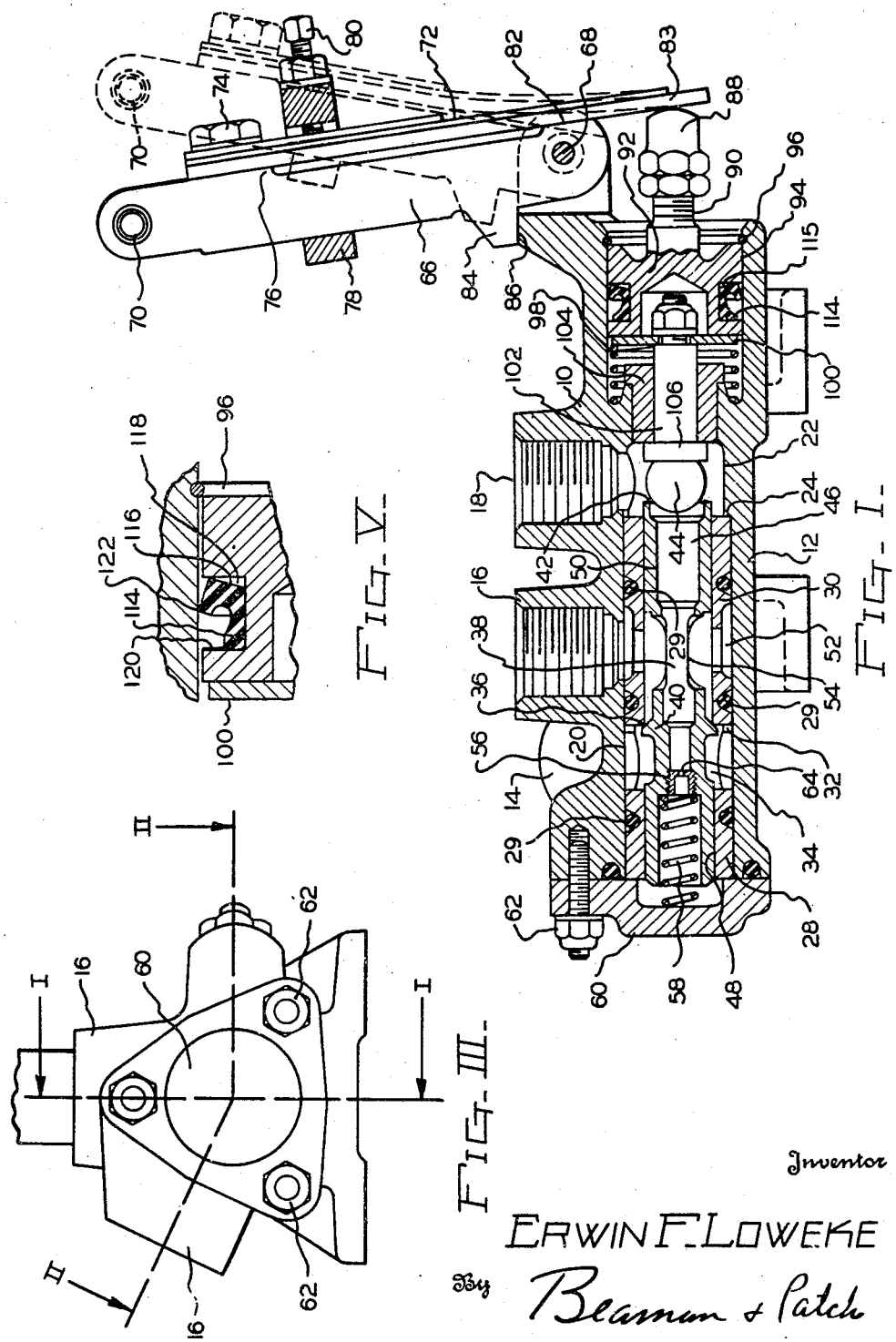
Inventor
ERWIN F. LOWEKE
By Beaman & Patch

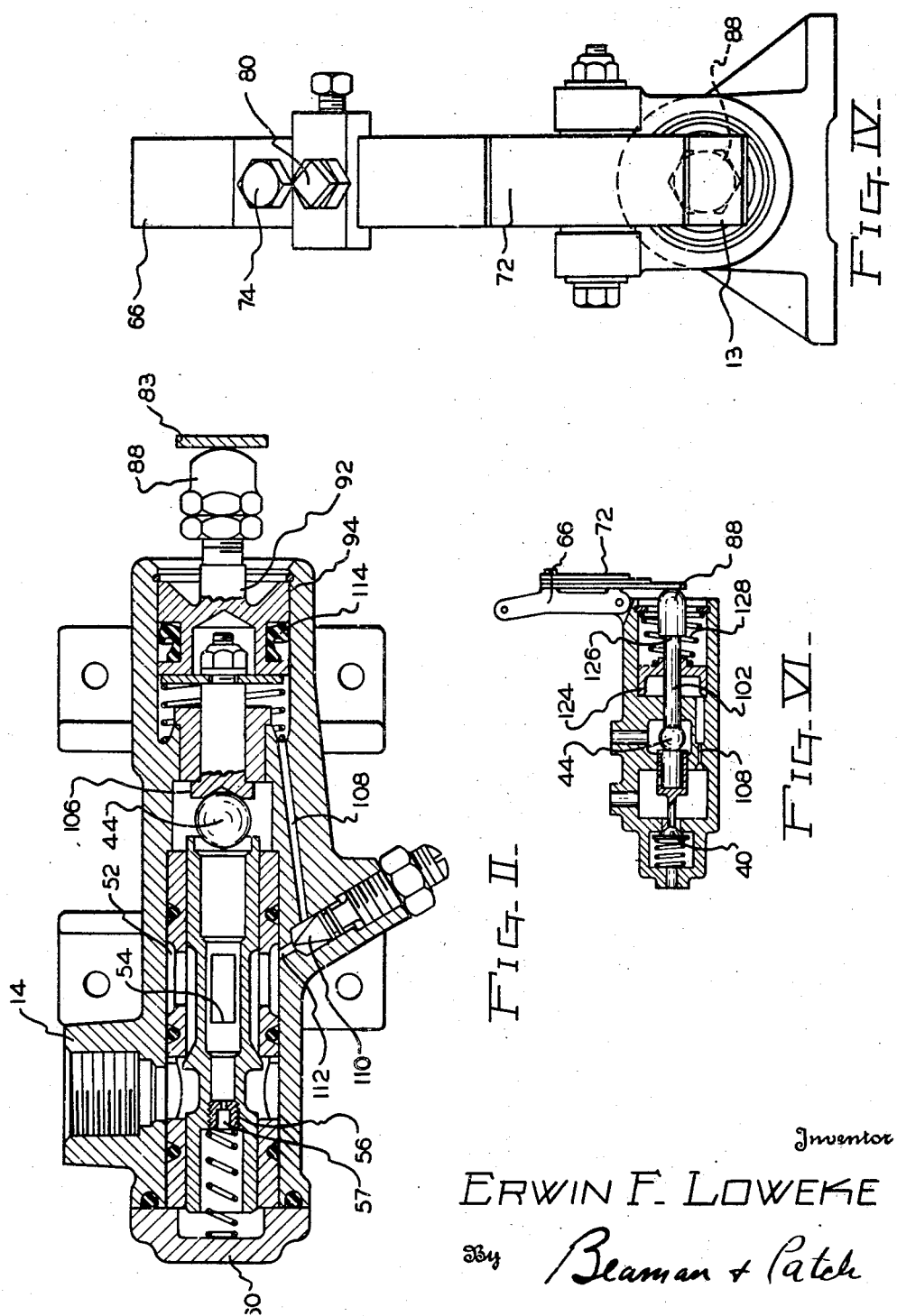

Patented July 12, 1949

2,476,054

UNITED STATES PATENT OFFICE 2,476,054

PRESSURE-REGULATING VALVE ASSEMBLY

Erwin F. Loweke, Jackson, Mich., assignor, by mesne assignments, to The B. F. Goodrich Company, Akron, Ohio, a corporation of New York Continuation of application Serial No. 545,638, July 19, 1944. This application April 14, 1948, Serial No. 21,037

3 Claims. (Cl. 303—54)

This application is a continuation of my application Serial No. 545,638, filed July 19, 1944, now abandoned.

The invention relates to improvements in power brake valves used in hydraulic brake systems in which the operating fluid is non-compressible.

Although the principles of construction and operation of the present invention have application in many fields, they have particular application to aircraft brakes. In this field, it is of considerable importance to synchronize the brake pedal reaction with actual brake application. Also, the present high landing speeds require excessively fast acting pressure regulating valves to reduce time lag to a minimum in applying the brakes.

One of the features of the improvements herein disclosed has reference to the use of a displacement chamber with a non-compressible fluid for obtaining a "delayed load feel." The reaction pressure is metered through a choke into a displacement chamber of a suitable construction capable of absorbing an initial flow of non-compressible fluid before building up a reaction pressure for regulating purposes. Obtaining a delayed reaction in a brake valve through the use of a choke has been proposed in connection with the use of compressed air, as for example, in the Andres et al. Patent No. 2,275,338. However, where non-compressible fluids are being used as the operating medium, compressed air valve structure is not adaptable.

Thus it is an object of the present invention to provide an improved brake valve for non-compressible fluid having a "delayed load feel."

Another object is to provide a valve of the type described in which a non-compressible fluid is metered into a displacement chamber for absorbing an initial flow prior to the development of pressure regulating movement.

A further object is to provide a power brake valve for non-compressible fluid in which a regulatable choke is provided for adapting the same valve to different operating conditions which influence valve performance, as for example, variations in brake return spring load, inertia of the braking members of different type brakes, extreme differences in brake displacement or in the head loss of the brake line and other similar variables.

These and other objects and advantages residing in the valve mechanism will more clearly appear from a consideration of the following specification and the annexed claims.

In the drawings,

Fig. I is a vertical section taken on line I—I of Fig. III, of a power brake valve for non-compressible fluid embodying the principles of the present invention.

Fig. II is a cross sectional view taken on line II—II of Fig. III,

Fig. III is an end view of the valve taken to the left of Fig. I,

Fig. IV is an end view of the valve taken from the right of Fig. I,

Fig. V is an enlarged view of the displacement chamber located behind the packing of the valve construction shown in Fig. I, and Fig. VI is a diagrammatic representation in vertical cross section of the operating principles of the present invention.

Referring to the drawings, the power brake valve 10, which has been specifically designed for the brake system of aircraft and for operating upon non-compressible fluid, comprises the main body 12 with tapped bosses 14, 16 and 18 constituting a fluid pressure inlet, brake outlet, and fluid return supply tank, connections, respectively. As viewed in Fig. I, the body 12 has a straight bore 20 and a co-axial bore 22 of reduced diameter separated by a shoulder 24. Fitted within the bore 20 are parts 28 and 30 separated along the line 32, part 28 being crossdrilled at 34 to connect with the pressure connection 14. The sealing ring 29 seals the parts 29 and 30 in the bore 20. This arrangement permits the grinding of the end of the part 30 along the line 32 to provide a flat concentric valve seat 36 perpendicular to the bore 20.

The tandem valve 38 has a poppet portion 40 which co-acts with the seat 36 to regulate the flow of non-compressible fluid under pressure between the conventional accumulator and the brake and a valve seat 42 for the ball 44 acting to close one end of the central passage 46 to the valve stem 38 connected with the supply tank connection 18. As shown, the poppet portion 40 is a part of and is carried with pilot piston 48 and 50 at opposite end of the valve stem 38; the piston 48 and 50 supporting the valve stem 38 for sliding movement in parts 28 and 30.

The central passage 46 communicates with the chamber 52 and the brake outlet connection 16 through cross port 54. Non-compressible hydraulic fluid admitted to the chamber 52 will flow in one direction through the port 54 and choke 56 into the spring chamber 58 formed in part by the end plate 60. Suitable means 62 support the plate 60 in position, holding the sleeve 30 against the shoulder 24. The choke 56 is provided with a screwdriver slot 57 and is threadably supported in the passage 46. By selecting a choke 56 having a a passage 64 of the proper cross section, one means for regulating the unbalance of valve 38 and delaying the closing of the valve 38 is provided due to throttling and dash pot action.

Through mechanism well known in the art, the lever 66, hinged at 68, is connected at the upper end 70 to a manually actuated linkage (not shown), which includes the brake pedal. For the operating connection between the lever 66 and the valve 10, a spring 72 is provided. As shown, a stud 54 holds the upper ends of the spring 72 to the boss 76 on the lever 66. The clamp 78, adjustable along the lever 66, acts through an adjustment screw 80 to preload the spring 72 against the abutment 82. By moving the clamp 78 along the lever, the characteristic of the spring 72 may be changed.

The lower end 83 of the spring 72, with a lug 84 engaging the top 86, is in a position of engagement with the adjustable end or nose 88 of the rod 90, which is part of the pressure regulating piston 92 supported in the pressure regulating chamber 94 for axial movement and urged against the retaining ring 96 by the spring 98. Between the spring 98 and the pressure regulating piston 92 is a washer 100 which cams the actuator 102, supported in the bushing 104 for axial movement, in having a recessed head 106 in which the ball valve 44 is supported and moved toward the seat 42.

In practice, the bushing 104 is preferably pressed fitted in position. As the diameter of the actuator 102 may be enlarged or reduced to change the unbalance of the valve, in production it is only necessary to change the inside diameter of the bushing 104 to correspond to the diameter of the selected actuator 102 in order to effect changes in the unbalance of the valve 38.

To those skilled in the principles of hydraulics and the flow of non-compressible fluids under pressure, it will be readily apparent that there will be a lag between the initial flow of fluid pressure upon displacement of the poppet portion 40 from its seat 36 and the application of the brake by fluid pressure directed through the brake outlet connection 16. Also, it is recognized as desirable to transmit back through the manual operative mechanism the actuating pressure being applied to the brake to give the operator a certain "feel" of brake operation. Due to the aforesaid lag, unless some provision is made to delay the reaction against the operator's foot, in the case of an aircraft brake, for example, a pilot receives the "feel" brake actuation prior to actual braking of the landing wheels. To correct the situation, it is necessary to synchronize the "feel" with the actual brake actuation. To accomplish this, a delaying mechanism has been provided in the form of a passage 108 extending between the chamber 52 and 94. In production, the restriction in the passage 108 may be a fixed orifice or it may be provided with an adjustable orifice in the form of a needle valve 110. The restriction at 112, adjustable through the needle valve 110, will delay the pressure buildup in the pressure regulating chamber 94 provided that some provisions are made for displacement losses. These displacement losses, with an operating fluid which is non-compressible, must be sufficient to absorb enough of the initial flow of non-compressible fluid through the choke, to delay the pressure buildup in the regulating chamber 94 to synchronize the same with the brake application resulting from the pressure buildup and fluid velocity in the chamber 52 and brake outlet connection 16 following the opening of the poppet portion 40. The provisions for providing displacement losses in the chamber 94 or equivalent may take many forms. A very simple arrangement is illustrated in Figs. I, II and V in which a distortable annular packing with a conical base 116 provides an annular clearance 118 with the groove 120 in which the packing 114 is positioned. As the pressure in the chamber 94 is all sealed to the left of the sealing point 122, a certain amount of displacement of the packing 114 can take place into the clearance 118. The amount of displacement of the packing ring 114 into the clearance 118, upon fluid pressure being admitted to the chamber 94, will depend upon the distortability of the ring 114 and its ability to return to its unstressed position upon brake releasing operation. It will be understood that the packing ring 114 is resilient, readily distortable material, as for example, rubber. In service should the amount of clearance 118 upon brake release increase or decrease appreciably the amount of delayed brake "feel" may be regulated by the needle valve 110.

The function of the packing ring 114 and the groove 120 becomes that of a piston, which upon brake application has limited displacement movement to the right before the pressure in the chamber 94 is able to buildup and be exerted against the piston 92 to react back to the brake pedal. In Fig. VI, this function is diagrammatically illustrated wherein the displacement of the packing ring 114 is represented by a piston 124 movable relative to the actuator 102 until the shoulder 126 is engaged. The spring 128 corresponds to the resiliency of the packing ring 114 while the shoulder 126 limits the movement of the piston 124 in the same manner as the wall of the groove 120 limits the displacement of the packing ring 114.

To provide rapid movement of the valve stem 38, the same is preferably unbalanced in the manner indicated, the degree of unbalance depending upon the characteristics of valve operation desired. It will be noted from a consideration of Fig. I, that flow of fluid between the connections 14 and 16 past the poppet portion 40 is relatively unobstructed with a minimum of turbulence. In operation, a valve construction according to the present invention provides a high sudden pressure surge in the chamber 52 upon opening the poppet 40 followed immediately by a sudden reduction in pressure indicating high velocity of fluid through the poppet portion 40 and fluid connection 16 as well as a rapid buildup to brake pressure.

To describe the operation, in its inactive position, the valve stem 38 is in the position shown in Fig. I with the connections 16 and 18 in communication. Pressure admitted through the connection 14 holds the valve stem 38 adjacent the seat 36 in an unbalanced state. To apply the brake, the operator rocks the lever 66 to cause the lower end 83 of the spring 72 to build up a pressure against the nose 88. With the valve stem 38 unbalanced, the spring 72 is preferably preloaded through the adjustment screw 80. Under the stress of the spring 72, the valve 44 is advanced to engage the seat 42. At this point further advancement is delayed until sufficient stress is built up in the spring 72 to overcome the unbalanced pressure holding the valve stem 38 in its closed position. The initial movement of the poppet portion 40 through movement of the pressure regulating piston 92, transmitted through the valve stem 38 produces a high pressure surge within the chamber 52. The surge induces accelerated movement of the fluid through the connection 16 into the brake system with a momentary reduction in pressure followed by a pressure buildup in the chamber 52 to the brake operating pressure. As heretofore described, the restriction 112 will so delay the pressure reaction through the passage 108 against the pressure regulating piston 92 as to synchronize the reaction or "feel" against the foot or brake pedal with the actual operation of the brake. It would be understood, however, that using non-compressible fluid, it is the ability of the displacement of the packing ring 114 to absorb the initial flow of non-compressible fluid through the choke 112, which provides the delayed action. As will be well understood, the brake operating pressure will be maintained as long as the ball valve 44 remains seated. Upon release of sufficient pressure through the pressure regulating piston 92 to permit the ball valve 44 to be moved to the position of Fig. I, the brake pressure will be reduced and fluid will flow between the connections 16 and 18. Upon brake release the parts of the valve structure will assume the position shown in full line in Fig. I and the packing ring 114, because of its inherent resiliency, will move to provide the clearance 118.

Having thus described my invention, what I desire to secure by Letters Patent and claim is:

1. A power brake pressure regulating valve for aircraft and the like for use in a brake system using a non-compressible operating fluid under pressure for brake actuation, said valve being characterized by its ability to synchronize actual brake application with brake "feel" at the foot pedal or the like and comprising a pressure inlet chamber, a pressure outlet chamber in communication with said inlet chamber and adapted to be connected to the brake, a valve part for regulating the flow of non-compressible fluid under pressure between said chambers, a pressure regulating chamber having a manually actuated member therein, means actuated by said member for actuating said valve part to direct fluid pressure to the brake, a fluid pressure connection between said outlet chamber and said pressure regulating chamber, a choke in said connection for metering a non-compressible fluid from said outlet chamber into said pressure regulating chamber, displacement structure in said regulating chamber construction and arranged for movement relative to said actuated member, said structure including a wall member displaceable by the initial flow of non-compressible fluid through said choke, and means limiting the displacement of said wall member relative to said actuated member to enable a buildup of fluid pressure in said regulating chamber passing through said choke and following the said initial flow therethrough whereby a delayed brake application "feel" reacts against said manually actuated member.

2. A power brake pressure regulating valve as defined in claim 1, wherein said choke includes an adjustable restricting valve.

3. A power brake pressure regulating valve as defined in claim 1 wherein said displacement structure and means takes the form of a sealing ring and groove defined in said piston.

ERWIN F. LOWEKE.

No references cited.